(12) United States Patent
Rooney

(10) Patent No.: US 6,390,420 B1
(45) Date of Patent: *May 21, 2002

(54) ELECTRICIAN'S CLIP AND METHOD OF USING

(76) Inventor: James E. Rooney, 23260 Wennersborg Rd. SW., Kensington, MN (US) 56343

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,719

(22) Filed: Jan. 8, 1999

(51) Int. Cl.$^7$ .................................................. F16L 3/08
(52) U.S. Cl. ......................................... 248/65; 248/200
(58) Field of Search ........................... 248/65, 49, 74.5, 248/74.1, 200; 174/101, 164, 169, 135, 146

(56) References Cited

U.S. PATENT DOCUMENTS

| | | |
|---|---|---|
| 501,439 A | 7/1893 | Reznor |
| 1,131,867 A | 3/1915 | Pyle |
| 1,175,802 A | 3/1916 | Orcutt |
| 1,399,960 A | 12/1921 | Harding |
| 1,431,662 A * | 10/1922 | Horning ...................... 248/65 |
| 1,755,545 A | 4/1930 | Lacey |
| 1,939,223 A | 12/1933 | Palmer |
| 2,291,148 A | 7/1942 | Carson |
| 2,823,002 A | 2/1958 | Savitz |
| 2,901,200 A | 8/1959 | Voeks |
| 3,034,185 A * | 5/1962 | Olsen .......................... 248/65 |
| 3,180,597 A | 4/1965 | Havener |
| 3,199,815 A * | 8/1965 | Martinkovic et al. ......... 248/59 |
| 3,211,825 A | 10/1965 | Clos |
| 3,266,761 A | 8/1966 | Walton et al. |
| 3,711,050 A * | 1/1973 | Case ........................... 248/300 |
| 3,724,795 A | 4/1973 | Callanan |
| D227,742 S | 7/1973 | Logsdon |
| 3,918,667 A | 11/1975 | Madden |
| 3,979,093 A * | 9/1976 | Madden ..................... 248/74.1 |
| D250,110 S | 10/1978 | Pallante |
| 4,436,266 A * | 3/1984 | Gerding ....................... 248/65 |
| 4,472,860 A | 9/1984 | Österlind |
| 4,730,852 A * | 3/1988 | Arscott ........................ 285/15 |
| 4,845,913 A | 7/1989 | Bell |
| 4,909,461 A | 3/1990 | Collins |
| 5,587,555 A | 12/1996 | Rinderer |
| 5,839,703 A * | 11/1998 | Tesar ........................... 248/65 |
| 5,967,354 A * | 10/1999 | Whitehead et al. .......... 220/3.3 |

FOREIGN PATENT DOCUMENTS

GB             720608          12/1954

* cited by examiner

Primary Examiner—Ramon O. Ramirez
(74) Attorney, Agent, or Firm—Merchant & Gould P.C.

(57) ABSTRACT

The present disclosure relates to a method for securing an electrical wire over a beam. The beam includes a side surface and a top surface that meet at an edge. The method includes providing a clip having a pair of spaced apart legs interconnected by a connection portion. The clip defines a slot located between the legs of the clip. The slot has a closed end positioned at the connection portion of the clip, and an open end positioned at free ends of the legs. In practicing the method, the electrical wire is positioned across the top surface of the beam. Next, the electrical wire is inserted into the slot of the clip. Once the electrical wire has been inserted into the slot, the legs of the clip are positioned against the side surface of the beam and the clip is oriented such that the closed end of the slot is positioned above the top surface of the beam, and the electrical wire extends between the connection portion of the clip and the top surface of the beam. Finally, the legs of the clip are fastened to the side surface of the beam such that the electrical wire is secured to the beam.

28 Claims, 2 Drawing Sheets

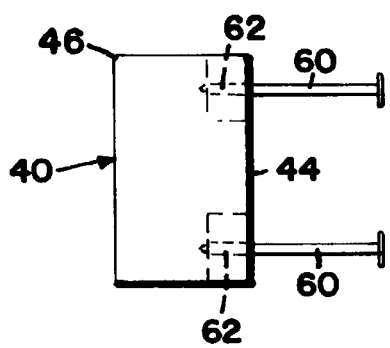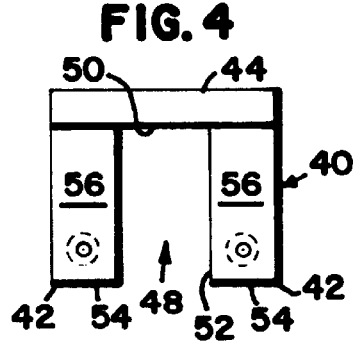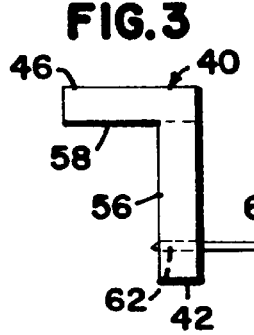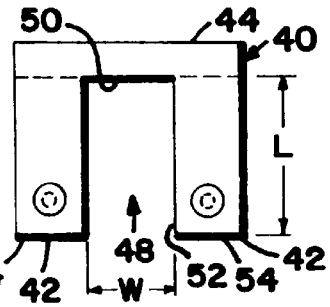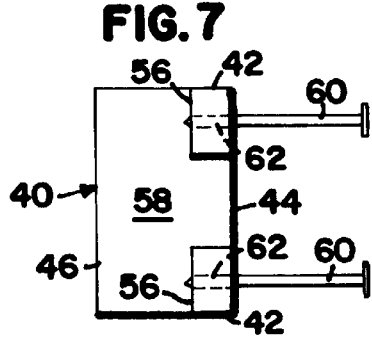

ELECTRICIAN'S CLIP AND METHOD OF USING

FIELD OF THE INVENTION

The present invention relates generally to mounting clips. More particularly, the present invention relates to clips for installing electrical wire, and methods for using such clips.

BACKGROUND OF THE INVENTION

Many houses use free span trusses to provide floor support. Free span trusses are advantageous because they eliminate the need for columns, poles, walls or other structures that are commonly positioned beneath a floor to provide floor support. A typical free span truss includes a top beam spaced from a substantially parallel bottom beam, and a plurality of angle supports positioned between the top and bottom beams.

When wiring a house having free span trusses, electrical wire is commonly strung through the trusses. For example, as shown in FIGS. 1 and 2, a standard clip 20 is commonly used to secure an electrical wire 22 to a bottom beam 24 of a truss 25. Typically, the clip 20 is secured to the bottom beam 24 by nails that are hammered into a top side 26 of the beam 24 such that the electrical wire 22 is captured between the clip 20 and the beam 24.

Clips such as the clip 20 shown in FIGS. 1 and 2 can be used efficiently if sufficient clearance is provided above the location where it is desired to secure the clip 20. However, in the case of a free span truss, the angle supports of the truss interfere with an electrician's ability to easily nail a clip to the bottom beam of the truss. For example, as shown in FIGS. 1 and 2, angle support 28 is positioned directly above the bottom beam 24. The positioning of the angle support 28 interferes with an electrician's ability to smoothly swing a hammer, and makes it difficult for the electrician to drive nails into the top side 26 of the bottom beam 24. The intensity of the problem is magnified in situations where ductwork and piping are also installed through the truss 25, because space constraints can require the clip 20 to be mounted in close proximity to a corner 30 formed between the bottom beam 24 and the angle support 28.

What is needed is an improved wire mounting technique for efficiently securing an electrical wire to a member (e.g., a beam) even in situations where an obstruction (e.g., an angle support of a free span truss) is located in close proximity to the member. What is also needed is a clip for facilitating practicing such a method.

SUMMARY OF THE INVENTION

One aspect of the present invention relates to clips, and methods for using such clips, that allow electrical wires to be efficiently secured to members (e.g., beams) even in situations where obstructions (e.g., angle supports of free span trusses) are located in close proximity to the members.

Another aspect of the present invention relates to a method for securing an electrical wire to a truss. The truss includes spaced-apart top and bottom beams interconnected by a plurality of angle supports. The bottom beam includes a side surface and a top surface that meet at an edge. The method includes providing a clip including a pair of spaced-apart legs interconnected by a connection portion. A slot is located between the legs of the clip. The slot has a closed end positioned at the connection portion of the clip, and an open end positioned at free ends of the legs. The method also includes positioning the electrical wire through the truss and across the top surface of the bottom beam and inserting the electrical wire into the slot of the clip. The method further includes positioning the legs of the clip against the side surface of the beam and orienting the clip such that the closed end of the slot is positioned above the top surface of the beam and the electrical wire extends between the connection portion of the clip and the top surface of the beam. Finally, the method includes fastening the legs to the side surface of the beam such that the electrical wire is secured to the beam.

A further aspect of the present invention relates to an article for securing an electrical wire to a member such as a beam. The article includes a clip having a pair of spaced-apart legs interconnected by a connection portion. The connection portion forms a lip that projects transversely outward from the legs. The clip defines a slot located between the legs of the clip. The slot has a closed end positioned at the connection portion of the clip, and an open end positioned at free ends of the legs. The slot is sized for receiving the electrical wire. The article also includes fasteners adapted to extend through the legs of the clip for securing the clip to the member.

Various advantages and features of novelty that characterize the invention are pointed out with particularity in the claims annexed hereto and form a part hereof. However, for a better understanding of the invention, its advantages, and the objects obtained by its use, reference should be made to the drawings that form a further part hereof, and to the accompanying descriptive matter, in which there are illustrated and described specific examples of aspects in accordance with the principles of the present invention.

BRIEF DESCRIPTION OF THE DRAWINGS

Referring now to the drawings in which like reference numbers represent corresponding parts throughout:

FIG. 3 is an end view of a clip constructed in accordance with the principles of the present invention;

FIG. 4 is a left side view of the clip of FIG. 3;

FIG. 5 is a ride side view of the clip of FIG. 3;

FIG. 6 is a top view of the clip of FIG. 3;

FIG. 7 is a bottom view of the clip of FIG. 3;

FIG. 8 shows clips in accordance with FIGS. 3–7 being used to secure electrical wires to a free span truss;

DETAILED DESCRIPTION

Figure 1:
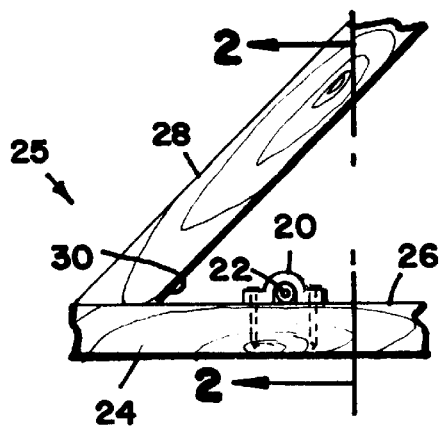
FIG. 1 shows a prior art clip used to secure an electrical wire to a truss.
Figure 2:
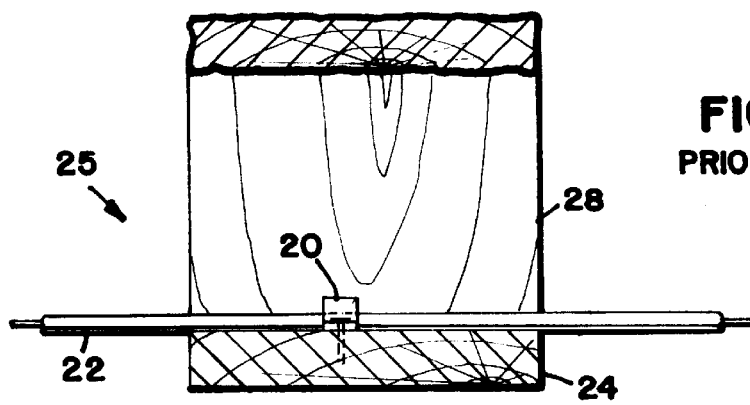
FIG. 2 is a cross sectional view taken along section line 2—2 of FIG. 1.

In the following description, reference is made to the accompanying drawings that form a part hereof and that are shown by way of illustration specific aspects by which the invention may be practiced. It is to be understood that other embodiments may be utilized as structural changes may be made without departing from the scope of the present invention.

FIGS. 3–7 illustrate a clip 40 constructed in accordance with the principles of the present invention. The clip 40 is preferably made of a non-conductive/dielectric material such as plastic. However, it will be appreciated that other types of materials can also be used.

Referring to FIGS. 3–7, the clip 40 includes a pair of spaced-apart legs 42 interconnected by a connection portion 44. The connection portion 44 forms a lip 46 that projects transversely outward from the legs 42. The clip 40 defines a slot 48 located between the legs 42 of the clip 40. The slot has a closed end 50 located at the connection portion 44 of the clip 40, and an open end 52 located adjacent free ends 54 of the legs 42.

The legs 42 of the clip 44 are preferably substantially parallel, and the connection portion 44 preferably extends transversely between the legs 42. Consequently, the slot 48 preferably has a generally rectangular shape. The slot 48 is sized for receiving an electrical wire. For example, in one particular embodiment of the present invention, the slot 48 has a length L of about ¾ inch, and a width W of about ½ inch. In another embodiment, the length L is equal to or less than about 1.5 inches (i.e., the typical width of a beam such as a 2×4), and the width W is equal to or less than 1 inch.

The legs 42 of the clip 40 are preferably generally rectangular in shape. Each leg 42 includes a generally planar contact surface 56. The contact surfaces 56 are preferably generally coplanar with respect to one another.

The lip 46 of the clip 40 preferably also has a generally rectangular shape. Preferably, the lip 46 projects transversely outward from the contact surfaces 56 of the legs 42. The lip 46 includes a bottom alignment surface 58 that is preferably generally planar, and is preferably aligned at right angles with respect to the contact surfaces 56 of the legs 42.

Referring again to FIG. 3, fasteners 60 (e.g., screws or nails) are preferably used to secure the clip 40 to a structure such as a beam. The fasteners 60 preferably extend through pre-formed or drilled openings 62 that extend transversely through the legs 42 of the clip 40. Each opening 62 preferably extends through its corresponding leg 42 in a direction that is substantially parallel to the direction in which the lip 46 projects outward from the legs 42. In alternative embodiments, the openings 62 can extend in directions aligned at oblique angles with respect to the lip 46.

FIG. 8 shows two of the clips 40 being used to secure electric wires 64 to a free span truss 67. The truss 67 includes substantially parallel top and bottom beams 65 and 66. The beams 65 and 66 are interconnected by a plurality of angle supports 69 positioned between the beams 65 and 66. The angle supports 69 are aligned at oblique angles with respect to the top and bottom beams 65 and 66. Corners 76 are formed between the angle supports 69 and the beams 65 and 66.

The bottom beam 66 includes a substantially vertical side surface 68 aligned at right angles with respect to a substantially horizontal top surface 70. The side and top surfaces 68 and 70 meet or intersect at an edge 72. The clips 40 are shown secured to the bottom beam 66. It will be appreciated that the clips 40 could also be used to secure electrical wire beneath the top beam 65, or to secure electrical wire to any one of the angle supports 69. Also, as shown best in FIGS. 9 and 10, one of the clips 40 is shown mounted in close proximity to one of the corners 76 of the truss 67. This type of clip positioning can be used when structures such as piping or ductwork limit the amount of available space through which the wire can be passed.

In accordance with an exemplary method of the present invention, one of the electrical wires 64 is secured to the bottom beam 66 of the truss 67 by first positioning the electrical wire 64 through the truss 67 and across the top surface 70 of the bottom beam 66. Next, the electrical wire 64 is inserted into the slot 48 of the clip 40 by maneuvering the electrical wire 64 or the clip 40 such that the electrical wire passes through the open end 52 of the slot 48. Once the electrical wire 64 is positioned within the slot 48, the legs 42 of the clip 40 are positioned against the side surface 68 of the bottom beam 66. The clip 40 is preferably oriented such that the closed end 50 of the slot 48 is positioned above the top surface 70 of the bottom beam 66. In such an orientation, the electrical wire 64 preferably extends between the lip 46 of the clip 40 and the top surface 70 of the bottom beam 66. Finally, the legs 42 are fastened to the side surface 68 of the bottom beam 66 such that the electrical wire 64 is secured to the bottom beam 66.

Preferably, the legs 42 of the clip 40 are fastened to the side surface 68 of the bottom beam 66 by passing the fasteners 60 through the openings 62 defined by the legs 42 and into the side surface 68 of the bottom beam 66. For example, the fasteners 60 can be nailed or screwed through the openings 62 and into the side surface 68 of the bottom beam 66. It will be appreciated that in certain embodiments, the fasteners 60 can be hammered or screwed through the legs 42 without requiring preformed openings defined through the legs 42. Furthermore, in alternative embodiments, the legs 42 can be adhesively affixed to the side surface 68.

Figure 9:
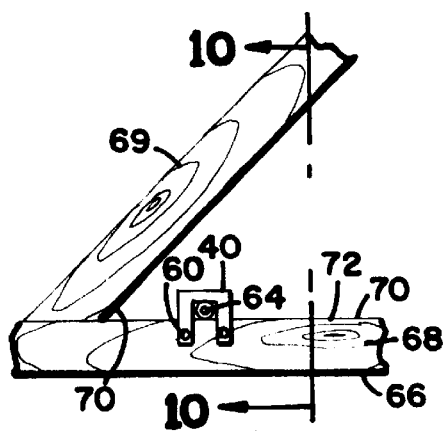
FIG. 9 is an enlarged view of one of the clips of FIG. 8.
Figure 10:
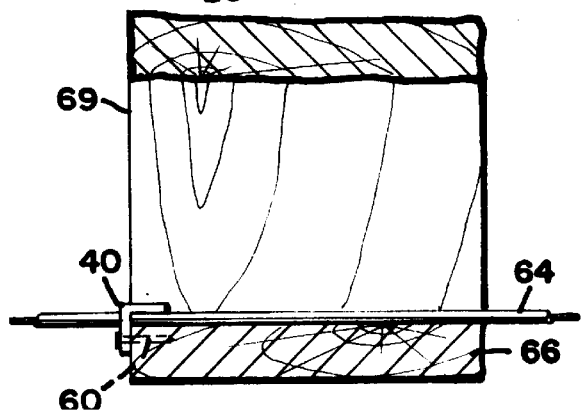
FIG. 10 is a cross sectional view taken along section line 10—10 of FIG. 9.

As mounted on the bottom beam 66, the contact surfaces 56 of the legs 42 abut against the side surface 68 of the bottom beam 66, and the lip 46 of the clip 40 extends over the top surface 70 of the bottom beam 66. The electrical wire 64 is positioned at the closed end 50 of the slot 48 and is captured or sandwiched between the alignment surface 58 of the lip 46, and the top surface 70 of the bottom beam 66. As shown in FIGS. 9 and 10, one of the clips 40 is being used to secure a single wire to a beam. Alternatively, each clip 40 can also be used to secure more than one wire to a beam. For example, multiple wires can be stacked within the clip slot 48 between the lip 46 and the beam. To accommodate different members of wires, the clip can be raised or lowered relative to the beam to which the wires are being secured.

As described above, a preferred use for the clip 40 is to secure electrical wires over beams in locations where minimal overhead clearance is provided. However, it will be appreciated that the clip 40 can also be used to secure an electrical wire to the bottom of a beam. For such a use, the legs 42 are preferably connected to one side of the beam, the lip 46 preferably extends beneath and opposes a bottom side of the beam, and the wire is captured between the bottom surface of the beam and the lip 46. It will be further appreciated that in certain circumstances, it may be desirable to use the clip 40 to secure an electrical wire along a side surface of a beam. For such a use, the clip 40 is oriented such that the legs 42 are secured to either the top or bottom side of the beam, and the lip 46 overlaps the side to which it is desired to secure the electrical wire. In this manner, the electrical wire extends vertically through the slot 48 and is captured between the lip 46 and the side surface of the beam. The clip 40 can also be used to secure an electrical wire to a column or any other type of support member. As is apparent from the above examples, the clip 40 can be used effectively in any situation where an obstacle limits access to a particular side of a structural support member.

The foregoing description of various exemplary aspects of the present invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

I claim:

1. A method for securing an electrical wire to a truss, the truss including spaced-apart top and bottom beams interconnected by a plurality of angle supports, the bottom beam including a side surface and a top surface that meet at an edge, the method comprising:

providing a clip including a pair of spaced apart legs interconnected by a connection portion, the clip defining a slot located between the legs of the clip, the slot having a closed end positioned at the connection portion of the clip and an open end positioned at free ends of the legs;

positioning the electrical wire through the truss and across the top surface of the bottom beam;

inserting the electrical wire into the slot of the clip;

positioning the legs of the clip against the side surface of the beam without nothing the beam and orienting the clip such that the closed end of the slot is positioned above the top surface of the beam and the electrical wire extends between the connection portion of the clip and the top surface of the beam; and fastening the legs to the side surface of the beam such that the electrical wire is secured to the beam.

2. The method of claim 1, wherein the legs of the clip are substantially parallel, and the connection portion of the clip extends transversely between the legs.

3. The method of claim 2, wherein the legs include contact surfaces that engage the side surface of the bottom beam, and the connection portion of the clip comprises a lip that projects transversely out from the contact surfaces and extends over the top surface of the bottom beam.

4. The method of claim 3, wherein the contact surfaces are generally planar and are aligned along a common plane and wherein the lip includes a planar alignment surface that faces the top surface and forms right angles with the contact surfaces.

5. The method of claim 3, wherein the legs of the clip are fastened to the side surface of the bottom beam by fasteners that extend through the legs and into the bottom beam.

6. The method of claim 5, wherein the fasteners are aligned generally parallel with respect to the lip.

7. The method of claim 6, wherein the fasteners comprise nails.

8. The method of claim 1, wherein the legs of the clip are fastened to the side surface of the bottom beam by fasteners that extend through the legs and into the bottom beam.

9. The method of claim 8, wherein the clip is made of plastic.

10. The method of claim 1, wherein the electrical wire is sandwiched between the connection portion of the clip and the top surface of the bottom beam.

11. The method of claim 1, wherein the slot defines a length that extends between the open and closed ends of the slot and a width that extends between the spaced apart legs, the length being equal to or less than 1.5 inches and the width being equal to or less than about 1 inch.

12. The method of claim 1, wherein the connection portion forms a lip that projects outward from the legs, the clip consisting essentially of an L-shaped profile.

13. A method for using a clip to secure an electrical wire to a member, the member including first and second surfaces that meet at an edge, the electrical wire extending across the first surface of the member, the clip including a pair of spaced apart legs interconnected by a connection portion, the connection portion forming a lip that projects outwardly from the legs, the clip defining a slot located between the legs of the clip, the slot having a closed end positioned at the connection portion of the clip and an open end positioned at free ends of the legs, the slot defining a length that extends between the open and closed ends of the slot and a width that extends between the spaced apart legs, the method comprising:

disposing the electrical wire in the slot;

positioning the legs of the clip against the second surface of the member without requiring the member to be notched, and orienting the clip such that the electrical wire extends between the lip of the clip and the first surface of the member; and fastening the legs against the second surface of the member without requiring the member to be notched.

14. The method of claim 13, wherein the legs of the clip define preformed transverse openings for receiving the fasteners.

15. The method of claim 14, wherein the legs are substantially parallel, and the lip extends outward from the legs in a direction generally parallel with respect to the transverse openings defined through the legs.

16. The method of claim 15, wherein the legs include planar contact surfaces through which the fasteners extend, the contact surfaces being arranged to form right angles with the lip.

17. The method of claim 13, wherein the length of the slot is equal to or less than about 1.5 inches and the width of the slot is equal to or less than about 1 inch.

18. The method of claim 13, wherein the electrical wire is compressed against the first surface by the lip.

19. An article for securing an electrical wire to a member, the article comprising:

a plastic clip including a pair of spaced apart legs having front and back sides, the clip also including a connection portion that interconnects the spaced apart legs, the clip defining a slot located between the legs of the clip, the slot having a closed end positioned at the connection portion of the clip and an open end positioned at free ends of the legs, the slot defining a length that extends between the open and closed ends of the slot, a width that extends between the spaced apart legs, and a depth that extends between the front and back sides of the legs, the length being equal to or less than about 1.5 inches and the width being equal to or less than about 1 inch, the clip being configured for allowing the front sides of the of the legs to be pressed against the member without requiring the member to be notched; and fasteners that extend through the front and back sides of the legs for securing the clip to the member.

20. The article of claim 19, wherein the connection portion forms a lip that projects outward from the legs such that the clip has a generally L-shaped profile.

21. An article for securing an electrical wire to a member, the article comprising:

a clip including a pair of spaced apart legs and a connection portion that interconnects the spaced apart legs, the clip defining a slot located between the legs of the clip, the slot having a closed end positioned at the connection portion of the clip and an open end positioned at free ends of the legs, the slot defining a length that extends between the open and closed ends of the slot and a width that extends between the spaced apart legs, the length being equal to or less than 1.5 inches and the width being less than about 1 inch; and the connection portion forming a lip that projects outwardly from the legs.

22. The article of claim 21, wherein the legs define fastener receiving openings that extend through the legs in a direction generally parallel to the lip.

23. The article of claim 21, wherein the lip is free of holes.

24. The article of claim 21, wherein the length of the slot is 0.75 inches.

25. The article of claim 24, wherein the width of the slot is 0.5 inches.

26. The article of claim 21, wherein the legs of the clip define preformed transverse openings for receiving fasteners.

27. The article of claim 26, further comprising fasteners positioned in the openings.

28. The article of claim 27, wherein the fasteners comprise nails or screws.

* * * * *